INVENTOR.
WILLIAM C. HUNTTING
BY
ATTORNEY

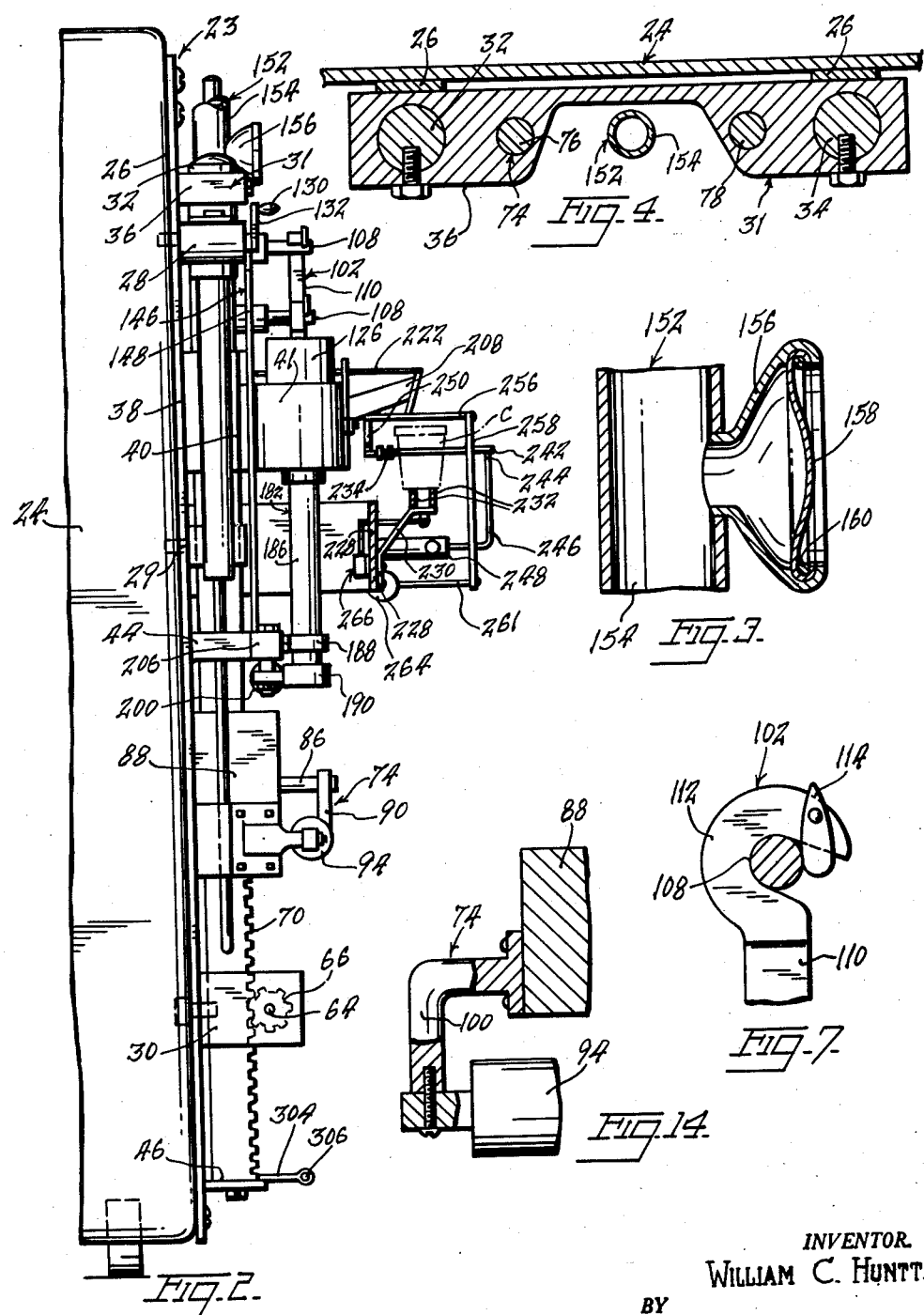

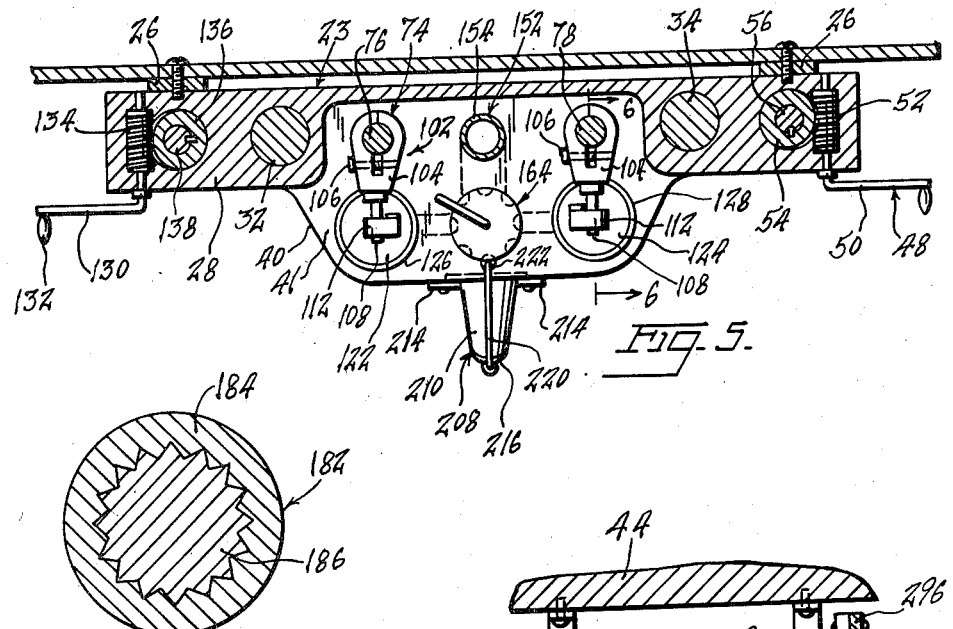
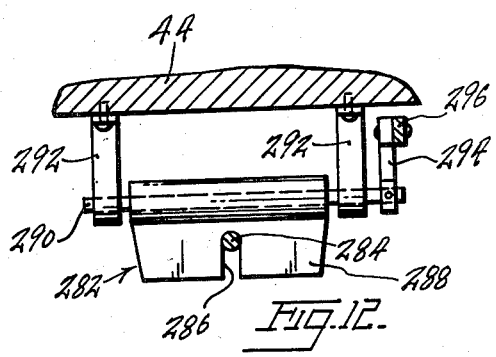
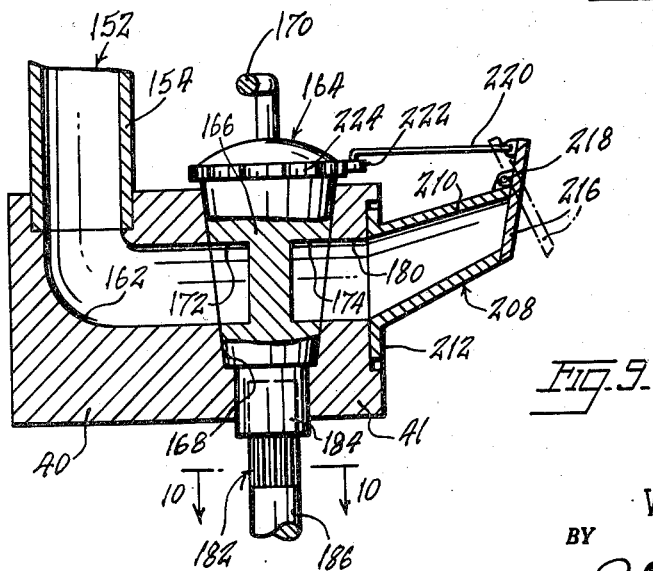

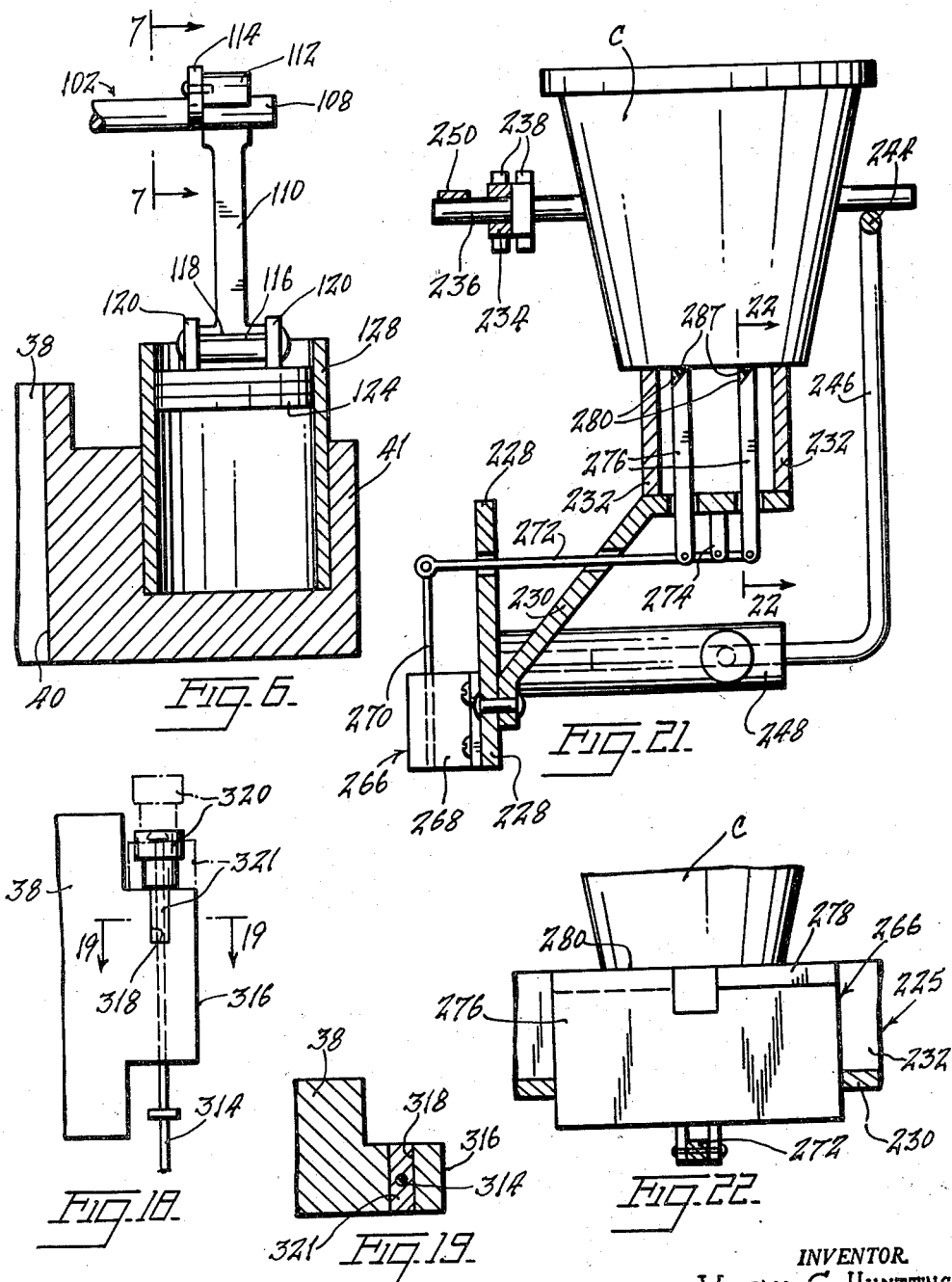

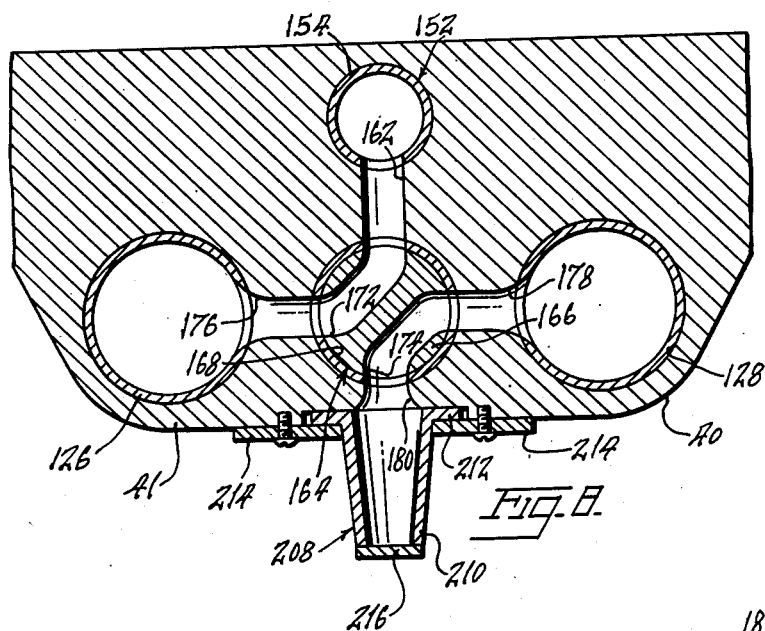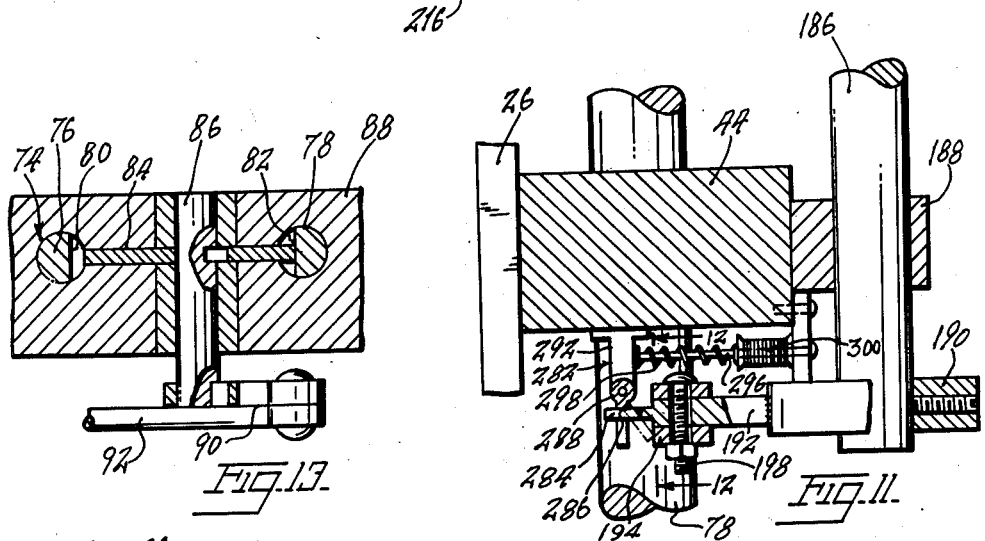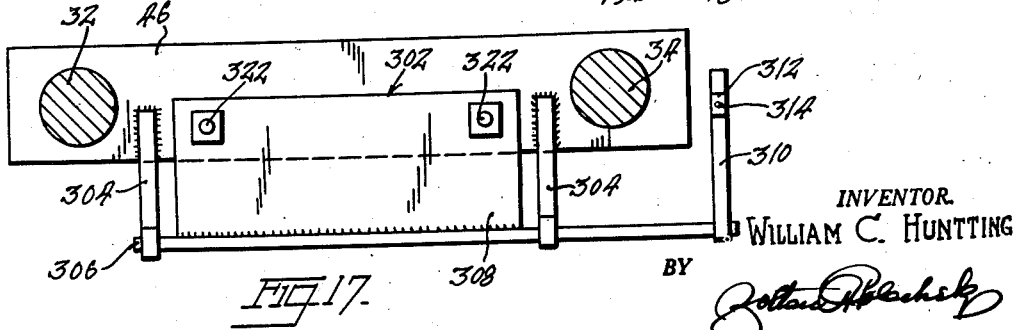

April 23, 1957 W. C. HUNTTING 2,789,588
CONTINUOUS FLOW, UNIVERSAL DISPENSER AND ICE CREAM FILLER
Filed Dec. 1, 1954 6 Sheets-Sheet 6

INVENTOR.
WILLIAM C. HUNTTING
BY
ATTORNEY

//  2,789,588
Patented Apr. 23, 1957

2,789,588

CONTINUOUS FLOW, UNIVERSAL DISPENSER AND ICE CREAM FILLER

William C. Huntting, Falmouth, Mass.

Application December 1, 1954, Serial No. 484,767

9 Claims. (Cl. 141—78)

This invention relates to automatic container filling apparatus, especially adapted for packaging semi-solid products, under conditions in which the products are piped to and through the apparatus in a continuous flow.

The apparatus is adapted for the handling of such semi-solids as ice cream, cheese, lard, or butter. It will also, however, fill containers with liquids such as milk, orangeade, orange juice, cider or water. In this connection, the adaptability of the structure for packaging bulk ice cream will be particularly stressed subsequently in these objects and the appended description. However, this will merely show the particular suitability of the apparatus for packaging this particular product, and is not to be taken as restrictive of the uses of the invention.

Continuous flow ice cream freezers should not be stopped in operation, since the ice cream would immediately freeze to the freezer walls. This will result in a solidly frozen mass, the taste and texture of which would be affected adversely. Further, since the mix is under pressure, breakage of the pipes or other damage to the freezer would result.

At the point at which the ice cream is packaged, it should be under minimum pressure, and there should be no vacuum. This is due to the fact that air injected in the product during manufacture is held in suspension therein, and when evenly distributed improves the texture. Pressure or vacuum conditions compact the product unduly and force the air therefrom.

The main object of the present invention is to provide an automatic container filling apparatus which will package a product such as ice cream under minimum pressure and without vacuum, under conditions in which the product flows continuously and at a constantly uniform rate of speed to the apparatus.

The apparatus is operated by air or hydraulic pressure, adjustable to any desired speed, or to synchronize the speed with the flow of the product to the apparatus from a product manufacturing structure such as an ice cream freezer.

Other objects are to provide a device as stated which will be wholly portable and self-contained, so as to be movable to any selected location upon a conveyor system; will be easily disassembled for cleaning wherever it is in contact with the product; will be readily adjustable for filling containers of different sizes; will be readily adjustable for regulating the quantity of the product deposited in each container; will be well adapted for packaging products of a semi-solid nature having solid particles dispersed therethrough (such as ice cream with nuts added); and will fill containers of any shape, whether round, square, or rectangular.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 2 is a side elevational view, a portion of a cabinet on which the apparatus is mounted being broken away.

Fig. 3 is an enlarged section on line 3—3 of Fig. 1 showing a pressure relief means in the supply tube.

Fig. 4 is an enlarged transverse section on line 4—4 of Fig. 1.

Fig. 5 is an enlarged transverse section on line 5—5 of Fig. 1.

Fig. 6 is a sectional view through one of the filler piston assemblies on line 6—6 of Fig. 5, the scale being still further enlarged.

Fig. 7 is a sectional view, the scale being enlarged still further, on line 7—7 of Fig. 6.

Fig. 8 is a greatly enlarged sectional view through the main valve assembly, on line 8—8 of Fig. 1.

Fig. 9 is a sectional view through said valve assembly 9—9 of Fig. 1.

Fig. 10 is an enlarged section on line 10—10 of Fig. 9.

Fig. 11 is an enlarged section of the valve assembly operating mechanism, on line 11—11 of Fig. 1.

Fig. 12 is a sectional view on line 12—12 of Fig. 11.

Fig. 13 is an enlarged sectional view of the filler piston drive means, on line 13—13 of Fig. 1.

Fig. 14 is an enlarged sectional view on line 14—14 of Fig. 1.

Fig. 17 is an enlarged sectional view on line 17—17 of Fig. 1, showing the means for adjusting the length of the filler piston stroke.

Fig. 18 is a fragmentary front elevational view, on an enlarged scale, of the manual control for the means of Fig. 17.

Fig. 19 is a transverse section on line 19—19 of Fig. 18.

Fig. 21 is an enlarged transverse sectional view through the means of Fig. 20, on line 21—21 of Fig. 20.

Fig. 22 is a detail sectional view of the container vibrating means, on line 22—22 of Fig. 21.

The invention comprises a plurality of interrelated assemblies, each of which will be described under its own heading.

Main frame

Figure 1:
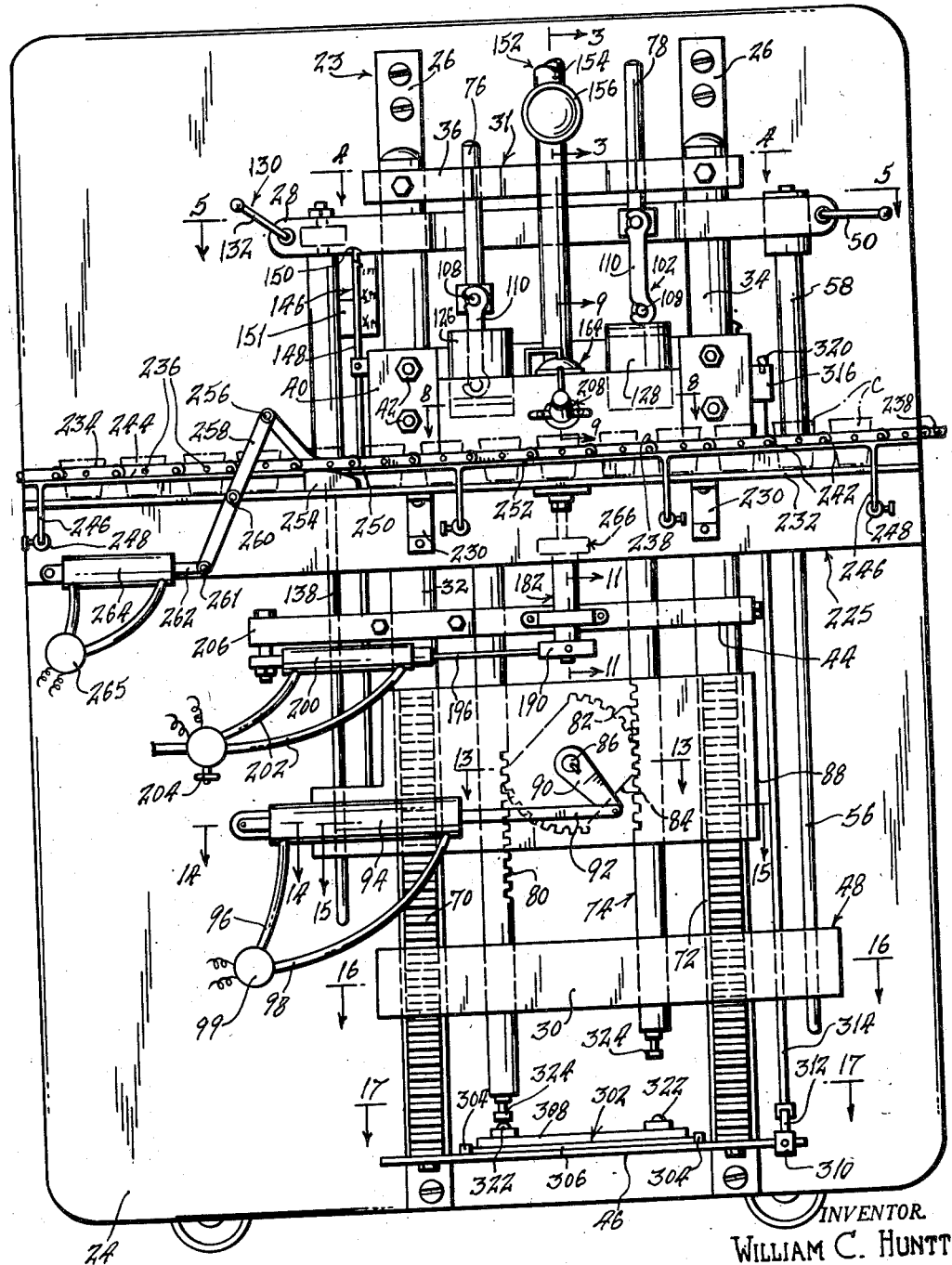
Fig. 1 is a front elevational view of a filling apparatus formed in accordance with the present invention.
Figure 16:
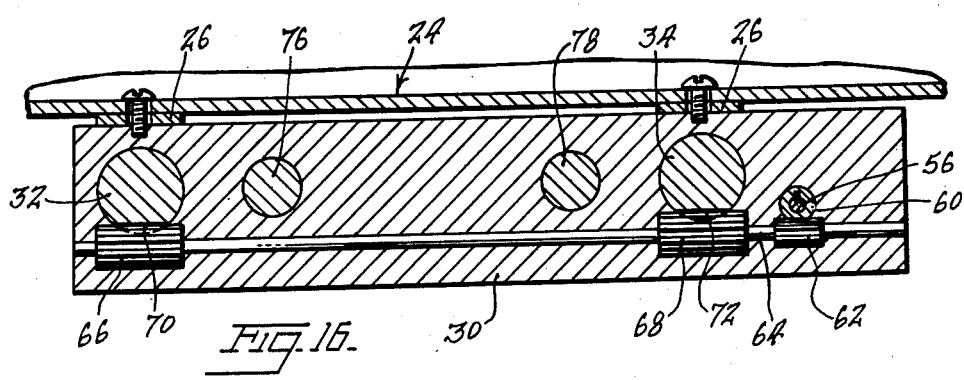
Fig. 16 is an enlarged sectional view on line 16—16 of Fig. 1, showing the means for adjusting the filler assembly for different container heights.
Figure 20:
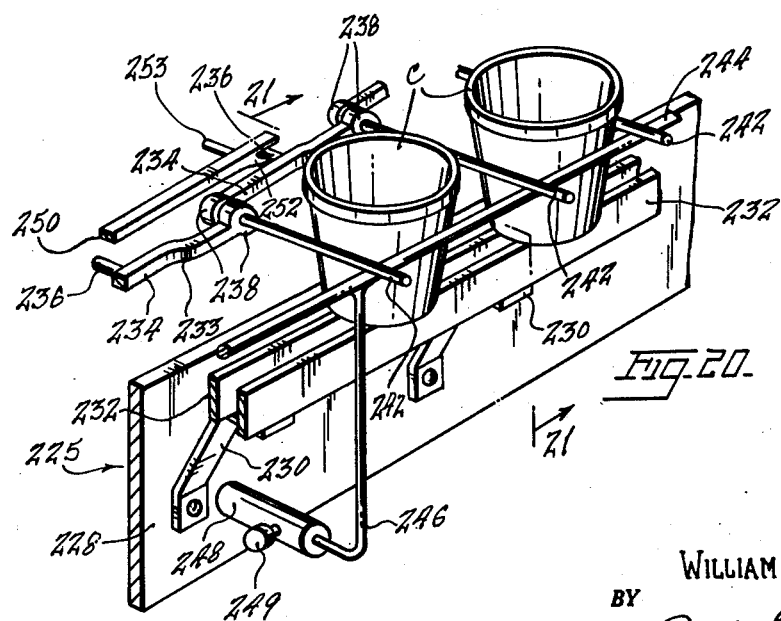
Fig. 20 is a fragmentary perspective view of the container support and advancing means.

The main frame, designated generally 23 and best shown in Figs. 1 and 2, includes a large, rectangular, wheeled cabinet 24 in which spare parts, special attachments, etc. may be stored. Flat, wide elongated frame strips 26 are bolted to the front wall of the cabinet in spaced relation. The strips are vertical and secured fixedly adjacent its ends to the strips (Fig. 5) is a horizontal upper cross bar 28 having medially between its ends a deep, elongated recess formed in its front surface. An intermediate cross bar 29 (Fig. 2) and a bottom cross bar 30 (Figs. 1 and 16) are secured to the strips similarly to cross bar 28.

The main frame parts described above, fixedly connected in the specified relationship, are rollable as a unit to any location desired adjacent a container conveyor. At the selected location the parts of the main frame are stationary support members for the remaining, moving parts of the device.

Main carriage

A main carriage generally designated 31, best shown in Fig. 1, is mounted on the main frame 23 for vertical adjustment. It comprises a pair of elongated, transversely spaced, vertical support rails 32, 34. Extending between and fixedly connected to the upper ends of rails 32, 34 is a horizontal upper guide bar 36. A horizontally extending filler assembly support bar 38 (Fig. 2) has openings through which the rails extend. Guide bar 36 is disposed above the upper frame cross bar 28, while bar 38 is disposed below said cross bar 28.

Positioned against the front of bar 38 is a filler assembly casting 40, formed intermediate its ends with a forwardly projecting, thickened ledge 41 (Figs. 5 and 8). Studs 42, extending through registering openings of the bar 38 and casting 40, are threaded into the rails 32, 34, to fixedly connect these components of the carriage.

Below the bar 38, a horizontal valve operating assembly support bar 44, extending between and having adjacent its ends openings receiving the rails 32, 34, is fixedly connected to the rails.

At their lower ends, the rails are attached to the ends of a horizontal bottom end plate 46.

The several parts of the carriage, being fixedly connected to one another, are a single unit, mounted for up and down sliding movement in the main frame, due to the provision of vertically aligned openings in the frame cross bars 28, 29 and 30, in which openings the rails 32, 34 are slidably mounted.

Carriage position adjusting assembly

A carriage position adjusting assembly 48 (Fig. 5) includes, at one end of main frame cross bar 28, a hand crank 50 journalled in cross bar 28 and adapted to rotate a worm 52 meshing with a gear 54 keyed to an elongated, vertical shaft 56 (Fig. 1) journalled in a sleeve 58 depending from and attached to cross bar 28. Adjacent its lower end shaft 56 (Fig. 16) is journalled in lower frame cross bar 30, and is there keyed to a worm 60 meshing with pinion 62 fixed to a horizontal driven shaft 64 journalled in and extending the length of cross bar 30. Fixed to shaft 64 are gears 66, 68, meshing with rack teeth 70, 72 formed upon the lower end portions of rails 32, 34.

In this way, rotation of crank 50 will adjust the entire carriage upwardly or downwardly upon the main frame.

Filler piston drive assembly

Carried by the carriage 31, so as to be adjusted in a vertical direction therewith, is a filler piston drive assembly 74, best shown in Figs. 1, 13, and 14. It includes a pair of elongated, vertical filler piston support rods 76, 78, spaced transversely of one another in the space between carriage rails 32, 34. Adjacent their lower ends, the rods are formed with confronting, inwardly facing rack teeth 80, 82 meshing with the teeth of a gear segment 84 keyed to a stub shaft 86 rotating in a bushed journal provided in a filler piston drive assembly support bar 88 having openings receiving rails 32, 34.

One end of the stub shaft projects forwardly from the bar 88, and keyed thereto is a crank arm 90, to the outer end of which is pivotally connected one end of a drive piston rod 92 extending from a piston mounted in a drive cylinder 94. Air hoses 96, 98 extend to the opposite ends of the cylinder, the flow of air therethrough being controlled by an electrically operated valve 99. Cylinder 94 (Fig. 14) is mounted to swing in a vertical plane upon an L-shaped arm 100 bolted to a laterally projecting extension provided upon one end of the bar 88.

The valve 99 is of a type which when the circuit is closed therethrough mechanically opens the inlets to hoses 96, 98 and thus controls the flow of air under pressure through hoses 96, 98 in such a way as to continuously alternate said flow between the hoses, thus exerting air pressure on both ends of the piston in cylinder 94 causing reciprocation of the piston rod 92. This in turn causes gear 84 to rotate first in one direction and then in another through less than a full cycle of rotation. As a result, the rods 76, 78 simultaneously reciprocate in opposite directions relative to one another.

Possibly, instead of a gear 84 and rack teeth 80, 82, there might be used a construction in which arms fixed to and extending radially in opposite directions from a wheel fixed to shaft 86 are pivotally connected by links to rods 76, 78, so as to impart the desired reciprocation in opposite directions to the rods responsive to rocking of the shaft 86 in the manner previously described.

Filler piston assembly

A filler piston assembly generally designated 102 (Figs. 1, 2, 5, 6 and 7) comprises, on each of the rods 76, 78, a horizontally and forwardly extending clamp 104 having a longitudinally slotted, widened inner end embracing the associated rod, said end being clamped to the rod by a screw 106 extending through and threadedly engaged in one of the clamp portions defined at opposite sides of the slot.

Extending outwardly from the smaller or outer end of the clamp is an arm 108, on the free end of which is suspended a link 110 having at its upper end a hook 112 engaging the arm and held onto the arm by a pivoted dog 114.

At its lower end, each link or hanger 110 is formed with a hook 116 supporting a pin 118 engaged at its opposite ends in spaced, upstanding ears 120. Ears 120 are secured to the upper surfaces of pistons 122, 124 and are each provided with a suitable sealing ring, the respective pistons being mounted to work vertically in cylinders 126, 128 mounted in cylinder-receiving, upwardly opening recesses of the ledge 41.

By reason of this arrangement, it is seen that on operation of the filler piston drive assembly, the pistons 122, 124 will be oppositely reciprocated within their associated cylinders, that is, when piston 122 is in its down stroke, piston 124 will be in its up stroke, the pistons reaching the limits of their strokes simultaneously.

Position adjuster for filler piston drive and filler piston assemblies

Figure 15:
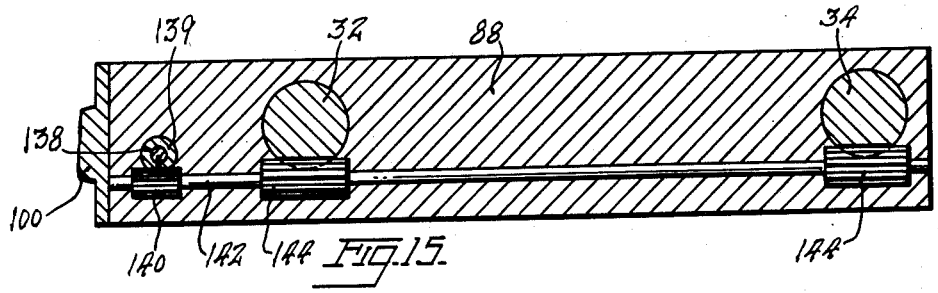
Fig. 15 is an enlarged transverse section on line 15—15 of Fig. 1, showing the means for regulating the quantity of the product deposited in each container.

The position adjuster 130 (Figs. 5 and 15) for the assemblies 74, 102, shifts these assemblies as a unit vertically upon the carriage, in each position to which the carriage itself is adjusted. This means includes a hand crank 132 journalled in that end of frame bar 28 opposite crank 50. Crank 132 is keyed to and rotates a worm 134, in mesh with a gear 136 keyed to a vertically extending, elongated shaft 138. Shaft 138 (Fig. 15) adjacent its lower end is journalled in the bar 88, and within the bar is keyed to a worm 139, rotating a gear 140 secured to a shaft 142, that extends the length of and is rotatable within the bar 88. Fixed to shaft 142 are spaced pinions 144 in mesh with the rack teeth 70, 72 of rails 32, 34.

When the crank 132 is rotated, the bar 88, cylinder 94, gear 84, rods 76, 78, and the piston assembly 102, are all shifted vertically as a unit upon the carriage. As a result, the rest positions of the pistons 122, 124 are adjusted vertically within the cylinders 126, 128. Means 130 is for the purpose of adjusting the quantity of the product deposited within each container. The carriage adjusting means 48, on the other hand, is for adjusting the carriage 31, filler piston drive assemblies 74, and filler piston assembly 102 as a unit, to position the same at different elevations, according to the height of the container which is to be filled.

Quantity indicating means

A quantity indicating means 146 (Fig. 1) is carried by the bar 88, for vertical adjustment with said bar. Said means includes an elongated rod 148 the lower end of which is seated in a suitable recess of bar 88, the upper end portion sliding in a guide carried by filler assembly support bar 38. At its upper end, rod 148 has a laterally projected pointer, and is formed with an upwardly opening, axial recess in which is frictionally and slidably mounted an extension pointer 150.

A scale 151, suitably calibrated to designate the amount of the product to be deposited in a container, is dependent from bar 28. When the product, such as ice cream, is to include nuts or other solid pieces that are not to be crushed, the extension pointer 150 is raised, and is used. This is due to the fact that in such circumstances, the container will be filled to a greater height, though still containing the same quantity.

Product supply assembly

An assembly 152 for supplying to the apparatus the product to be deposited in the containers includes (Figs. 1 and 3) a vertical supply tube 154 extending downwardly from an ice cream freezer, not shown, and constituting the discharge pipe of the freezer. The product accordingly flows continuously through tube 154, and adjacent the lower or outlet end of the tube, a flared fitting 156 is in communication at its smaller end with the tube. At its larger end, fitting 156 has mounted therein a rubber diaphragm 158 removably held in place by a split spring ring 160.

At the conclusion of filling each container, the flow of the product is momentarily halted, to await placement of the next following container below the discharge spout of the apparatus. Since the product is to continuously flow through the tube 154 notwithstanding this fact, the fitting 156 and diaphragm 158 are provided. When the outlet end of tube 154 is momentarily closed, the product, forced into fitting 156, presses diaphragm 158 outwardly. When the outlet end of tube 154 again opens, the pressure on the diaphragm is relieved.

As shown in Figs. 8 and 9, the lower end of tube 154 is seated in communication with the inlet end of a main inlet passage 162 formed in ledge 41.

Valve assembly

A valve assembly 164 (Figs. 8 and 9) includes a tapered plug valve 166 rotatably mounted in a complementary seat 168 formed in ledge 41. A hold-down arm 170 of inverted L-shape is rotatably mounted on the ledge, and is spring biased in a downward direction, the free end of the arm bearing in a complementary recess formed in the upper end of the valve.

The valve has spaced passages 172, 174, each of which opens upon the side surface of the valve at locations spaced 90° apart circumferentially of the valve, the ends of passage 172 being spaced 90° from the ends of passage 174. Communicating between the valve seat and the cylinders 126, 128 are branch inlet passages 176, 178, disposed at opposite sides of the main inlet passage 162, and spaced 90° in each instance, from passage 162.

The valve rotates through 90° in one direction, and then rotates through 90° in an opposite direction. Thus, in one position of the valve, the ice cream, flowing continuously through tube 154, passes through passage 162 into the valve passage 172, and then through branch passage 176 into cylinder 126. Cylinder 126 fills with the product. This occurs while the piston 122, working in cylinder 126, is moving to the upper limit of its stroke. Piston 124, at the same time, is in its down stroke. Therefore, ice cream previously forced into cylinder 128 will be forced out of the cylinder through passages 178, 174, to a discharge passage 180. The ice cream is forced out of the cylinder 128 by the down stroke of piston 124.

When the pistons simultaneously reach the end of their up and down strokes, respectively, the valve position changes 90°, so as to now connect cylinder 128 with tube 154, and cylinder 126 with outlet passage 180. This permits the next container to be filled, said next container being filled with the ice cream which was previously deposited in the cylinder 126.

Valve assembly operating means

A means 182 for rotating the valve in opposite directions includes (Figs. 10 and 11) a spline sleeve 184 fixed to and depending from the lower end of the plug valve. Engaged in the sleeve is the splined upper end of a valve shaft 186 extending vertically below ledge 41 and journalled in a bearing 188 mounted on bar 44. To the lower end of shaft 186 is secured a collar 190, formed with a radial arm 192 pivotally connected to and between fork arms 194 provided upon one end (Fig. 1) of a piston rod 196, said rod being connected to arm 192 by a bolt 198.

Rod 196 is affixed at its inner end to a piston working back and forth in a cylinder 200 to the opposite ends of which extend air hoses 202 alternately fed with air under pressure by an electrically operated valve 204. Cylinder 200 is pivotally connected at one end, for swinging in a horizontal plane, to a block 206 fixedly secured to the bar 44.

With air fed alternately between hoses 202, rod 196 will reciprocate, to cause the desired partial rotation, in opposite directions, of the valve 166.

Discharge spout assembly

A discharge spout assembly 208 (Figs. 8 and 9) includes a tapered spout body 210 communicating at its inner, larger end with the outlet passage 180 and inclined upwardly in a direction away from said passage 180. At its inner end, body 210 is formed with a flange 212 seating in a shallow recess formed in the front of ledge 41, and engaged in said recess by medially pivoted locking arms 214 mounted upon the front of the ledge.

A clapper valve 216 is mounted on the outer end of the spout body, and pivots between the full and dotted line positions of Fig. 9. The clapper valve is forced to its open position by the products being dispensed. The valve 216 is medially fulcrumed upon a pin 218 carried by body 210, and at its upper end is pivotally connected to one end of a rod 220, on the other end of which is rotatably mounted a small roller 222 moving into and out of depressions defined by a circumferential series of flutes 224 formed upon the upper end of valve 166.

The flutes are so arranged as to cause the clapper to close each time a container is filled and a new container is being positioned for filling, that is, the clapper closes during each change in position of the valve 166.

Container support assembly

A container support assembly 225 (Figures 1, 20, 21, and 22) includes an elongated support plate 228 disposed in a vertical plane. A plurality of brackets 230 are secured to plate 228, and supported upon said brackets are horizontally extending, transversely spaced rails 232 on which the containers C slide.

Container advancing assembly

A means for advancing the containers upon the assembly 225 has been designated generally at 233 (in Fig. 20) including a shifter chain composed of a plurality of bar shaped links 234 each of which includes a body having laterally offset leading ends, the opposite ends of the body of each link being integral with apertured enlargements 238, and being made rigid intermediate its ends with a laterally projecting shifter pin 236.

The rear enlargement of each shifter chain link is aligned with and is in side-by-side relation to the front enlargement of the chain link next following, and extending through the aligned, side-by-side enlargements 238 are the inner ends of horizontally and transversely extending container shifter bars 242. The outer ends of bars 242 are slidably supported upon a wire rail 244 mounted upon the upstanding legs of L-shaped support elements 246 mounted for adjustment transversely of the path of movement of the shifter chain within tubes 248 carried by the plate 228, and secured in selected positions of said adjustment by set screws 249.

It will be understood that the apparatus would be so designed as to permit any of a number of different shifter chains to be used, depending upon the size of the containers C to be filled. Thus, the shifter chain illustrated could be removed, and a chain having substantially shorter links than those illustrated might be substituted therefor, to reduce the distance between each pair of bars 242, so as to accommodate smaller containers.

The apparatus would of course be used in conjunction with a conveyor mechanism that would shift the containers C into position upon the rails 232, where said containers C would be moved along by the bars 242 on driving of the shifter chain, the containers after being filled being returned into supported relationship to the conveyor, not shown, that is used for transporting the containers to and from the apparatus.

An elongated arm 250 has at one end a depending finger 252 adapted to engage each laterally projected shifter pin 236, so as to shift the chain a selected distance longitudinally of the plate 228. Interposed in the pocket defined between each pair of adjacent bars 242 is a container C and thus, each container is moved into position under the discharge spout, after filling of the container next in front of the same.

A cam plate 254, mounted under the inner end portion of arm 250, is adjustably mounted upon plate 228. This is so arranged that when the arm is pulled back preparatory to engaging the next bar 242, an inwardly and laterally projecting pin member 253 fixedly secured to the leading end of the bar 250 (Figure 20) contacts the cam plate at the leading edge of the cam, to elevate the arm 250 slightly so that it will not drop down and engage the wrong pin 236 on its next forward motion.

At its inner end the arm 250 is pivotally connected to a cross pin 256, that is pivotally connected at its other end to the upper end of a medially fulcrumed lever 258 pivoted at 260 upon the table to swing in a vertical plane. Lever 258 at its lower end is pivotally connected at 261 to a piston rod 262 of a piston working in a cylinder 264, and reciprocated by air fed alternately through hoses connected to the opposite ends of the cylinder and extending from a control valve 265.

Vibrator assembly

A vibrator assembly 266 (Figs. 21 and 22) acts upon each container while the container is in filling position, vibrating the container and rotating the same upon the trackway 228. This assembly includes a conventional vibrating device 268 which is maintained in continuous operation. Extending upwardly from the vibrator 268 is a rod 270 pivotally connected to one end of a lever 272. Spaced longitudinally of the outer end portion of lever 272, are upstanding, flat, vibrator plates 276, the upper edges of which contact the underside of the container C. Vibrator plates 276 are disposed at opposite sides of a fulcrum bracket 274 on which the lever 272 is pivoted.

The upper end of each plate 276 (Fig. 22) has intermediate its ends an upwardly opening recess and at opposite sides of the recess, the upper edge of the plate is oppositely beveled as at 278, 280.

It has been found that this produces a rotatable movement of the container, to insure uniform filling thereof, and furthermore there is produced a vibratory action of the container which assures even more the uniform distribution of the product therein.

Valve operating assembly lock unit

In Figs. 11 and 12 there is shown a unit 282, for momentarily locking the valve operating assembly 74 in a neutral position wherein the valve is out of communication with the respective cylinders, outlet passage, and inlet passage. This neutral positioning of the valve occurs at the exact moment when a filled container is moved out from under the discharge spout, and a new container is being positioned under the spout. The lock unit includes an axial extension 284 on arm 192, engageable in a notch 286 formed in a lock plate 288 having a rolled upper edge receiving and fixedly secured to a pin 290 rockably mounted in spaced, depending brackets 292 carried by bar 44. To one end of pin 290 there is secured a crank arm 294, to the outer end of which is pivotally connected one end of a solenoid plunger 296 about which is circumposed a spring 298, the plunger being part of a solenoid 300 mounted upon the bar 44.

The solenoid is energized at all times when the valve is being actually rotated by the assembly 74. When energized, the solenoid retracts the plunger, pulling upon arm 294 and shifting plate 288 to the dotted line, unlocking position thereof shown in Fig. 11. This permits arm 192, and hence the entire valve rotating mechanism, to move backwardly and forwardly for rotating the valve in opposite directions.

The solenoid is deenergized, however, at all other times, and spring 298, tending to expand, tends to shift plate 288 to its full line position of Fig. 11. As a result, the axial extension 284 momentarily engages in notch 286, as the extension 284 traverses the plate 288. This locks the valve for a minute fraction of time in a neutral, inoperative position, to await a change of containers below the discharge spout. Then, the solenoid 300 immediately becomes energized once again, retracting the lock plates and permitting the continued movement of the extension 284 to shift the valve through the rest of its travel to its new position.

Piston stroke control assembly

A piston stroke control assembly 302 (Figs. 17, 18 and 19) includes a pair of bracket arms 304 projecting forwardly from the bottom end plate 46. Arms 304, at their outer ends, have aligned sleeves receiving the opposite end portions of a rock shaft 306 welded to a plate 308 disposed between arms 304. Fixedly connected to one end of shaft 306 is a crank arm 310, having at its free end an upstanding element 312 attached to a vertically extending steel cable 314. As shown in Figs. 18 and 19, cable 314 at its upper end is slidable in a housing 316 formed integrally upon one end of cross bar 38, and provided at its upper end with a diametrically extending recess 318. On the upper end of the cable there is attached a knob or head 320, having integrally formed thereupon a tongue 321 adapted to seat in recess 318.

In the full line position of Fig. 18, the cable 314 is lowered, so as to correspondingly swing downwardly the plate 308. One can lift upwardly on the head, however, and can turn the same 90°, the head 320 being swiveled upon the cable 314. This causes the tongue 321 to be disposed crosswise of the recess 318, thereby holding the head in the elevated position. This correspondingly elevates the free edge portion of the plate 308.

Mounted upon said free edge portion of plate 308 are micro-switches 322, located below the rods 76, 78. Adjustable feet 324 on the rods contact the switches, to alternately open and close the same.

By adjusting the head 320 between the full and dotted line positions of Fig. 18, one can elevate or lower the switches 322, so as to shorten the stroke of the rods 76, 78. As a result, the stroke of the pistons will be correspondingly shortened, to regulate the quantity of the product deposited in the containers C. The main purpose of this particular adjustment is to permit the product to be charged with nuts or other solid pieces which should not be crushed. In other words, the products can be packed more loosely, without changing the quantity of the product previously controlled by the adjusting means 130.

Operation

The device is completely portable as previously noted. Therefore, it can be moved to any desired location along a conveyor line found desirable. When properly located, containers passing along the conveyor are fed successively into position below the discharge spout. A source of air under pressure, not shown, applies air to the cylinders 94, 200 and 264.

Suitable electrical connections are provided between the switches 322 and the valves 99, 204, 265. As a result, with the switches 322 being alternately energized, said cylinder control valves will each feed air under pressure alternately through the two hoses extending therefrom. Alternate closing of switches 322 will thus cause the piston rods 92, 196, 262 to reciprocate in a predetermined, timed relationship to one another. The alternate closing and opening of each switch 322 is controlled, of course, by reciprocation of the rods 76, 78. Therefore, when the device is turned on by a suitable main switch, not shown, one of the switches 322 will close a circuit through the valves 99, 204, 265, effective to feed air through one hose of each of the associated cylinders. This starts the machine, and in a predetermined, timed relationship, containers C are successively moved into position below the discharge spout, while the pistons 122, 124 work within their cylinders to force the product into the following containers. Rotatable in timed relationship to the working of said pistons is the valve 166, feeding the product first to one cylinder 126 and then to the other cylinder 128.

The vibrator assembly operates continuously, but, if desired, it can be connected in circuit with the switches 322 in such a manner as to work only when a new container is positioned thereover and is being filled.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said apparatus further including vibrator means adapted for vibrating and rotating each container during filling thereof, said vibrator means including a pair of plates locatable beneath each container during filling thereof, each of said plates having oppositely beveled edges contacting the container.

2. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said main frame including a rollable cabinet, vertical frame strips on the cabinet, and cross bars extending between the strips at vertically spaced locations on the strips, said cabinet, strips, and cross bars being fixedly connected.

3. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said main frame including a rollable cabinet, vertical frame strips on the cabinet, and cross bars extending between the strips at vertically spaced locations on the strips, said cabinet, strips, and cross bars being fixedly connected, the carriage including a pair of vertical rails sliding in said cross bars, and cross members connected between said rails.

4. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said main frame including a rollable cabinet, vertical frame strips on the cabinet, and cross bars extending between the strips at vertically spaced locations on the strips, said cabinet, strips, and cross bars being fixedly connected, the carriage including a pair of vertical rails sliding in said cross bars, and cross members connected between said rails, the filler pistons and filler piston drive means being bodily adjustable vertically of the carriage to regulate the quantity of the products to be deposited in each container.

5. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers succesively into position below said discharge end, said filler piston drive means comprising a pair of oppositely reciprocating rods vertically and slidably mounted on the carriage, said rods having confronting rack teeth, a gear in mesh with said rack teeth for reciprocating the rods responsive to rotation of the gear in opposite directions, a cylinder receiving air under pressure, and means including a piston rod and crank connected between the gear and cylinder for rotating said gear in opposite directions.

6. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said filler piston drive means comprising a pair of oppositely reciprocating rods vertically and slidably mounted on the carriage, said rods having confronting rack teeth, a gear in mesh with said rack teeth for reciprocating the rods responsive to rotation of the gear in opposite directions, a cylinder receiving air under pressure, and means including a piston rod and crank connected between the gear and cylinder for rotating said gear in opposite directions, the filler pistons being suspended from the respective rods.

7. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said filler piston drive means comprising a pair of oppositely reciprocating rods vertically and slidably mounted on the carriage, said rods having confronting rack teeth, a gear in mesh with said rack teeth for reciprocating the rods responsive to rotation of the gear in opposite directions, a cylinder receiving air under pressure, and means including a piston rod and crank connected between the gear and cylinder for rotating said gear in opposite directions, said apparatus including switches contacted by the respective rods during reciprocation of the rods, said switches being adapted to control operation of the filler piston drive means, valve assembly, and container advancing means.

8. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said filler piston drive means comprising a pair of oppositely reciprocating rods vertically and slidably mounted on the carriage, said rods having confronting rack teeth, a gear in mesh with said rack teeth for reciprocating the rods responsive to rotation of the gear in opposite directions, a cylinder receiving air under pressure, and means including a piston rod and crank connected between the gear and cylinder for rotating said gear in opposite directions, said apparatus including switches contacted by the respective rods during reciprocation of the rods, said switches being adapted to control operation of the filler piston drive means, valve assembly, and container advancing means, said apparatus further including means to adjust the position of said switches relative to the rods to regulate the stroke of the filler pistons.

9. Apparatus for automatically filling a series of containers, comprising a main frame, a carriage thereon having inlet and outlet passages for a product to be deposited in the containers, a supply tube assembly extending to the inlet passage to feed said product thereto, filler pistons on the carriage adapted to receive material fed into the inlet passage and to pump the same to the outlet passage, means on the carriage to drive the filler pistons, a valve assembly on the carriage arranged between the inlet and outlet passages and adapted for channeling the product first to one piston and then to the other, means to support a series of containers below the discharge end of the outlet passage, and means to advance the containers successively into position below said discharge end, said main frame being stationary, the carriage being vertically adjustable upon the main frame, the filler pistons and filler piston drive means being jointly adjustable vertically of the carriage in each position to which the carriage is adjusted, and mechanism for indicating the amount of the product to be deposited in a container including an upstanding rod on the carriage having a pointer and a calibrated scale fixed on the frame coacting with the pointer.

References Cited in the file of this patent

UNITED STATES PATENTS

| | | |
|---|---|---|
| 507,316 | Fowler | Oct. 24, 1893 |
| 711,144 | Wright | Oct. 14, 1902 |
| 1,268,739 | Longrod | June 4, 1918 |
| 1,295,197 | Peters et al. | Feb. 25, 1919 |
| 1,451,512 | Kellogg | Apr. 10, 1923 |
| 1,569,300 | Purnis | Jan. 12, 1926 |
| 2,034,921 | Phillips et al. | Mar. 24, 1936 |
| 2,176,121 | Burnett | Oct. 17, 1939 |
| 2,482,593 | Palmer | Sept. 20, 1949 |

FOREIGN PATENTS

| | | |
|---|---|---|
| 56,262 | Netherlands | May 15, 1944 |